Dec. 7, 1948.         G. GUSTAFSON         2,455,760
HOSE CLAMP
Original Filed Jan. 20, 1943

Inventor

GUSTAF GUSTAFSON

By *Clarence A. O'Brien
and Harvey B. Jacobson*
Attorneys

Patented Dec. 7, 1948

2,455,760

UNITED STATES PATENT OFFICE 2,455,760

HOSE CLAMP

Gustaf Gustafson, Yakima, Wash.

Original application January 20, 1943, Serial No. 472,999. Divided and this application January 31, 1945, Serial No. 575,411

1 Claim. (Cl. 285—84)

This invention pertains to new and useful improvements in hose clamps, and is a division of my application Serial No. 472,999, filed January 20, 1943, which matured into Patent No. 2,371,439.

The primary object of the present invention is to provide, in a clamp of the type including a metallic strap, a novel construction and arrangement whereby a conventional coupling may be expeditiously and firmly anchored in a hose without the use of screws, bolts, wire, et cetera.

Other objects of the invention are to provide a hose clamp of the aforementioned character which will be comparatively simple in construction, strong, durable, compact and which may be manufactured at low cost.

All of the foregoing and still further objects and advantages of the invention will become apparent from a study of the following specification, taken in connection with the accompanying drawing wherein like characters of reference designate corresponding parts throughout the several views, and wherein.

Figure 1:
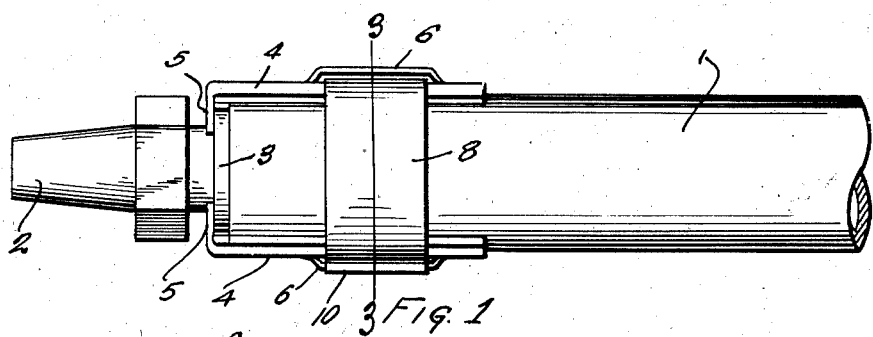
Figure 1 is a view in side elevation, showing a clamp constructed in accordance with the present invention in use.

Referring now to the drawing in detail, it will be seen that reference character 1 designates an end portion of a hose. A conventional coupling 2 has one end portion engaged in the hose 1. The coupling 2 includes the usual flange 3 for abutting engagement with the end of the hose 1.

The embodiment of the present invention which has been illustrated comprises a plurality of clips 4 in the form of elongated metallic sheets of arcuate cross section which are mounted longitudinally on the end portion of the hose 1. At one end, the clips 4 terminate in inturned hooks 5 which are engageable with the flange 3 for anchoring the coupling 2 in the hose 1.

Struck outwardly from intermediate portions of the clips 4 are longitudinally elongated loops 6 providing slots 7 in said clips. The loops 6 and the slots 7 accommodate a metallic strap 8 which is wrapped tightly around the hose 1 for firmly securing the clips 4 thereon and for compressing said hose on the coupling 2.

Figures 2, 3:
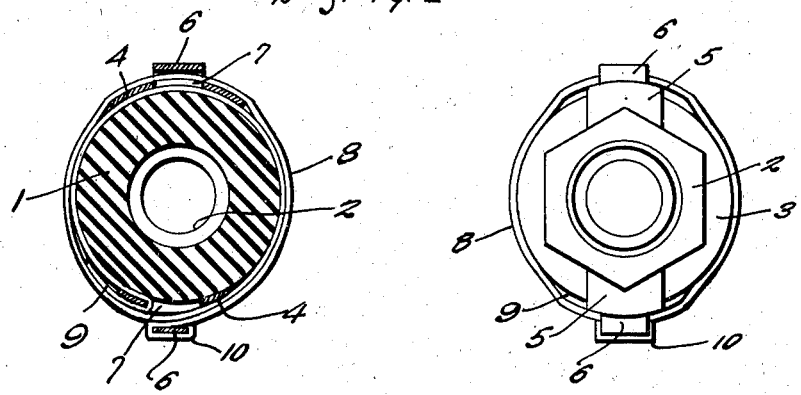
Figure 2 is a view in end elevation thereof.
Figure 3 is a cross sectional view, taken substantially on the line 3—3 of Figure 1.
Figure 4:
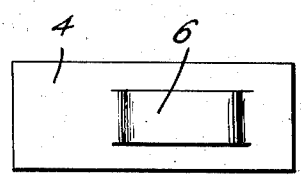
Figure 4 is a plan view of one of the clips.
Figure 5:
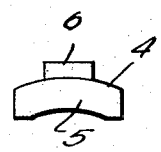
Figure 5 is an end elevational view of one of the clips.

As illustrated to advantage in Figure 3 of the drawing, one end portion of the metallic strap 8 is inserted through the slot 7 of one of the clips 4 from the inner side of said clip and bent back, as at 9. The strap 8 is then passed beneath the other clip 4 and inserted beneath the loops 6 of both of said clips. The other or free end portion of the metallic strap 8 is then inserted again beneath the loop 6 of said one clip 4 and tightened. In this manner the hose 1 is compressed about the nozzle 2. This end portion of the metallic strap 8 is then bent back, as at 10, for securing the clamp tightly on the hose and for compressing said hose on the coupling 2.

It is believed that the many advantages of a hose clamp constructed in accordance with the present invention will be readily understood, and although a preferred embodiment of the device is as illustrated and described, it is to be understood that changes in the details of construction may be resorted to which will fall within the scope of the invention as claimed.

What is claimed is:

A hose clamp comprising, in combination, a pair of similar separate clips in the form of elongated sheets of arcuate cross section adapted to be mounted and secured longitudinally of and upon opposite sides of a hose and to partially embrace the latter to secure a flanged fitting therein, each clip having an inturned hook at one end engageable with the flange of the fitting and having a longitudinal loop struck outwardly therefrom intermediate the sides thereof to form a slot in the clip inwardly of the loop, and a separate metallic strap having an end inserted outwardly through the slot of one clip and bent back over the latter at one side of its slot, said strap being tightly passed around one side of the hose and beneath the other clip, then tightly around the other side of the hose and through the loop of said one clip, then tightly around both sides of the hose and through the loops of both clips, the other end of the strap being bent over the loop of said one clip to secure the strap in tight condition with the hose compressed on the fitting.

GUSTAF GUSTAFSON.

REFERENCES CITED

The following references are of record in the file of this patent:

UNITED STATES PATENTS

| Number | Name | Date |
|--------|------|------|
| 234,822 | Taylor | Nov. 23, 1880 |
| 1,101,844 | Gething | June 30, 1914 |
| 2,349,538 | Craig | May 23, 1944 |